No. 895,945. PATENTED AUG. 11, 1908.
R. A. BERGER.
WRAPPING MACHINE.
APPLICATION FILED MAY 27, 1905.

11 SHEETS—SHEET 1.

FIG. I.

WITNESSES:
Allan H. Foose
M. B. Smith

INVENTOR
Richard A. Berger
BY his ATTORNEY
Alfred Wilkinson

No. 895,945. PATENTED AUG. 11, 1908.
R. A. BERGER.
WRAPPING MACHINE.
APPLICATION FILED MAY 27, 1905.
11 SHEETS—SHEET 2.
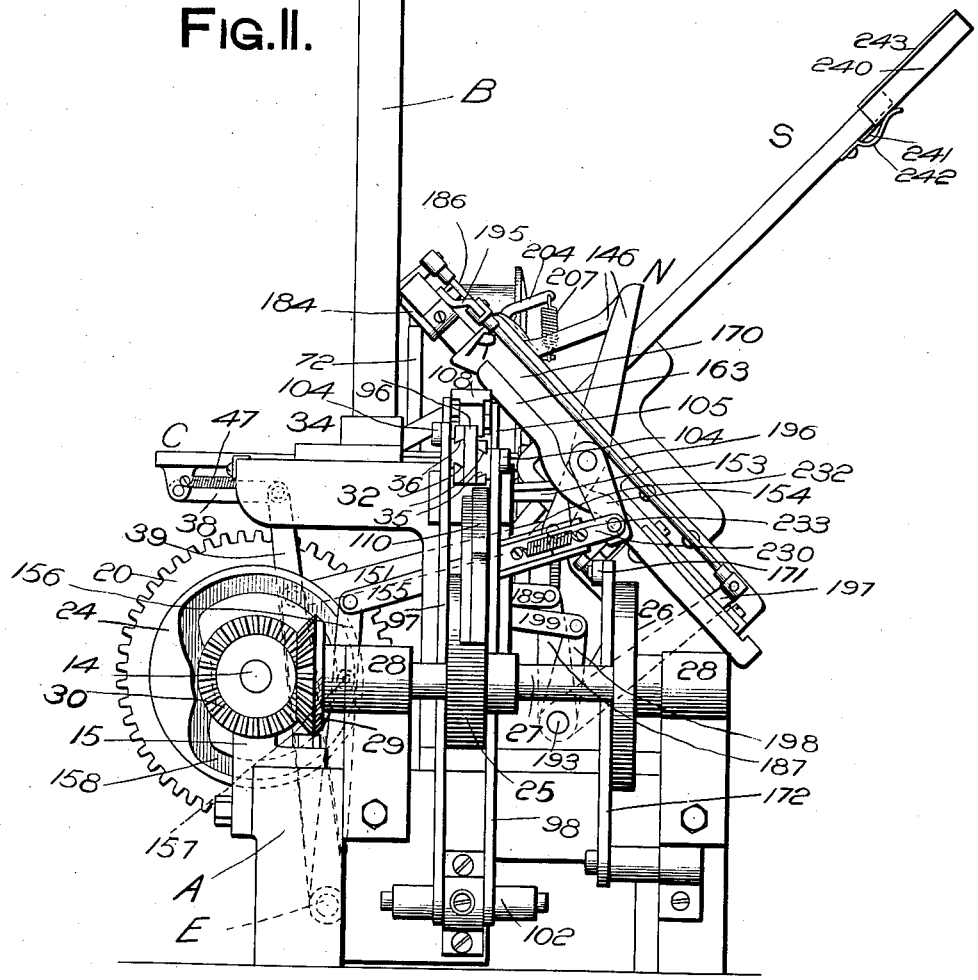
WITNESSES:
INVENTOR
Richard A. Berger
BY his ATTORNEY
Alfred Wilkinson

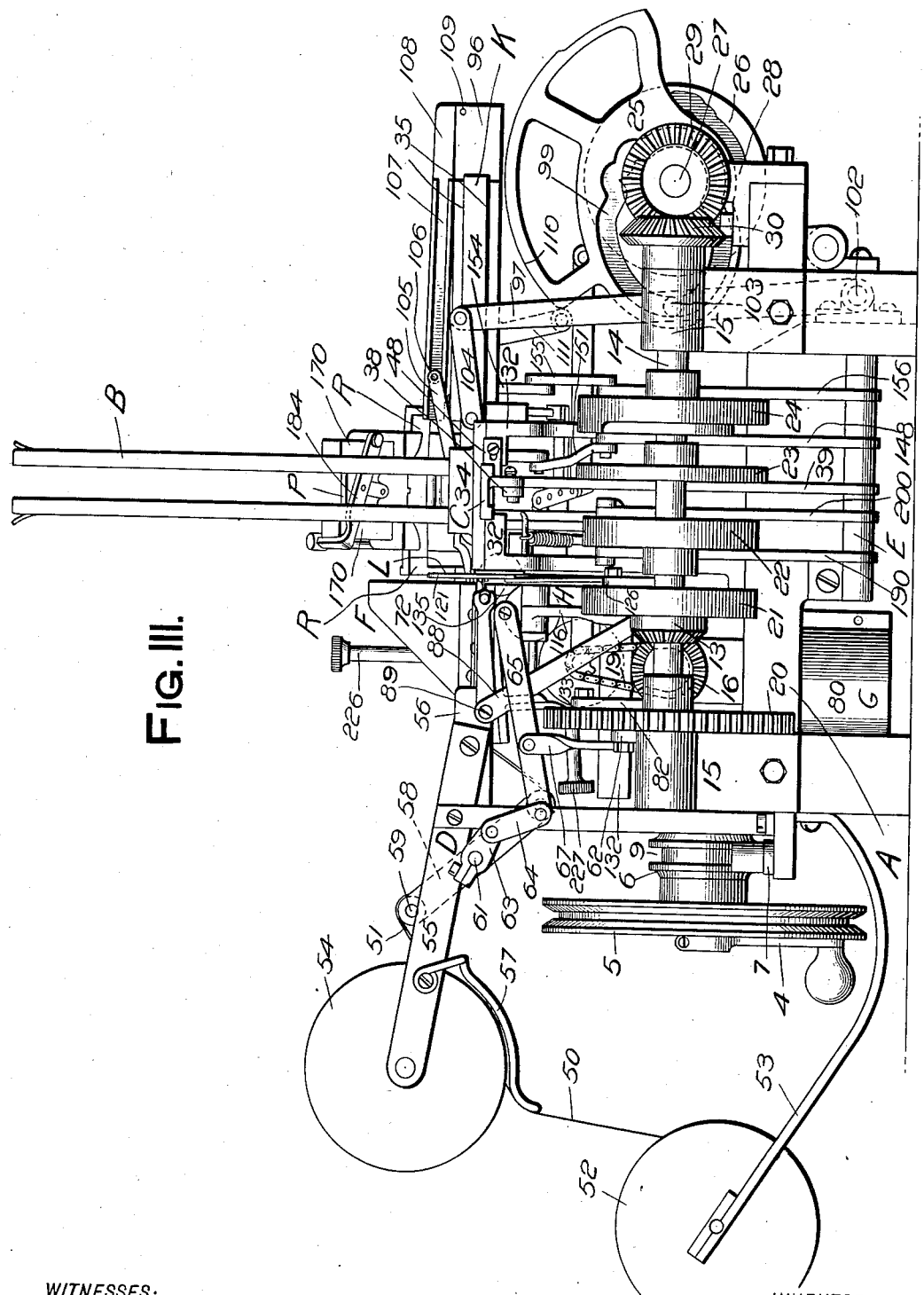

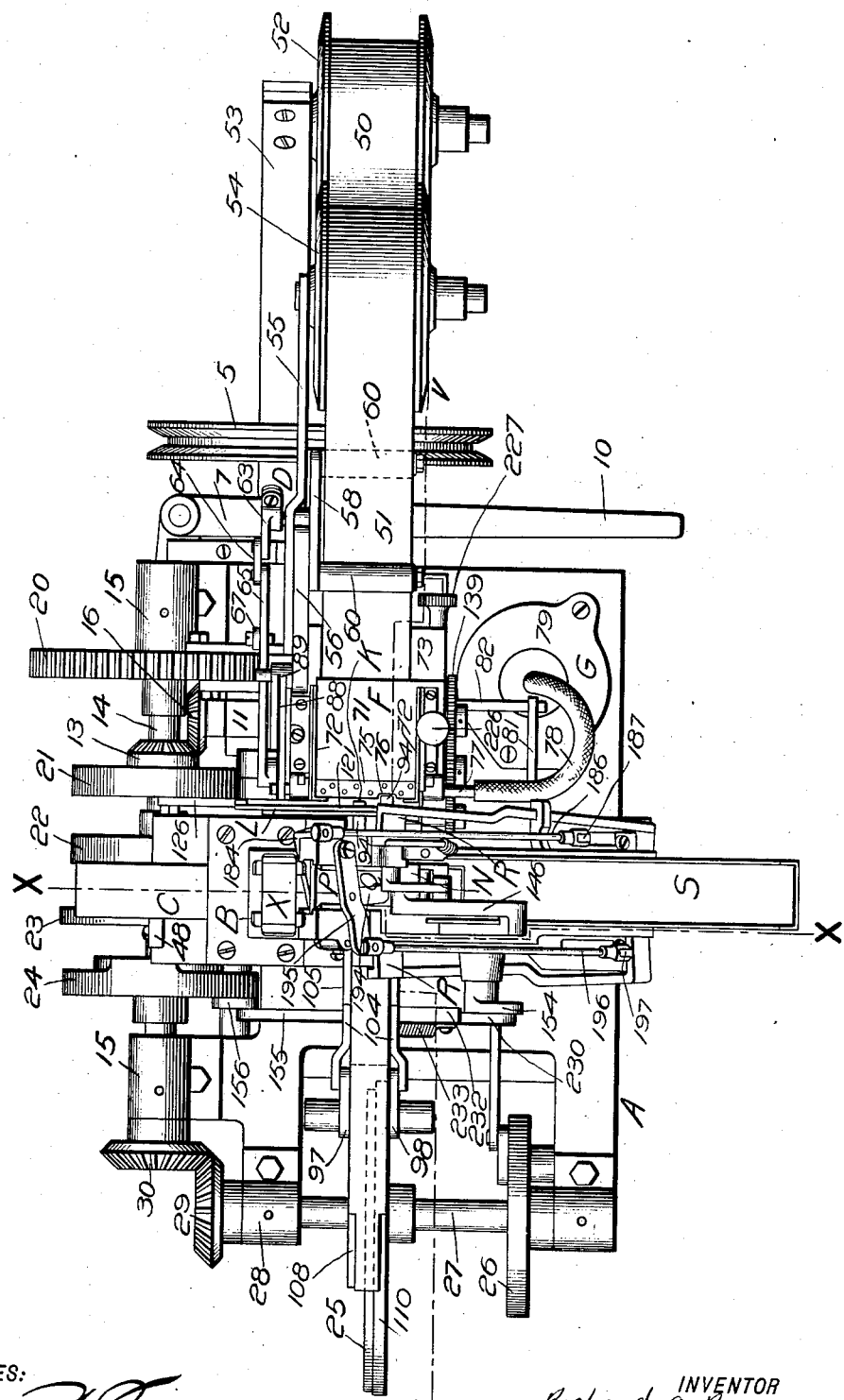

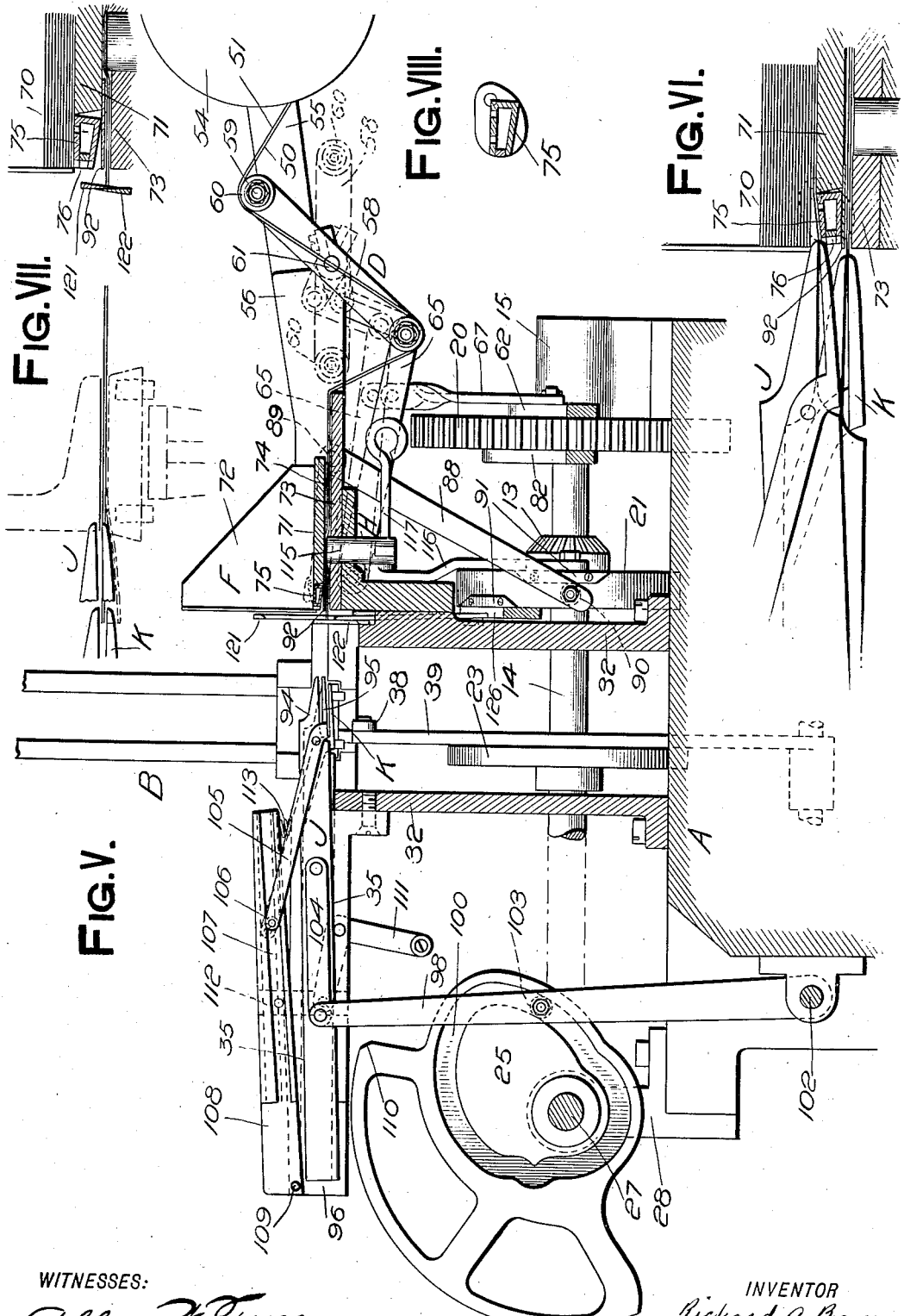

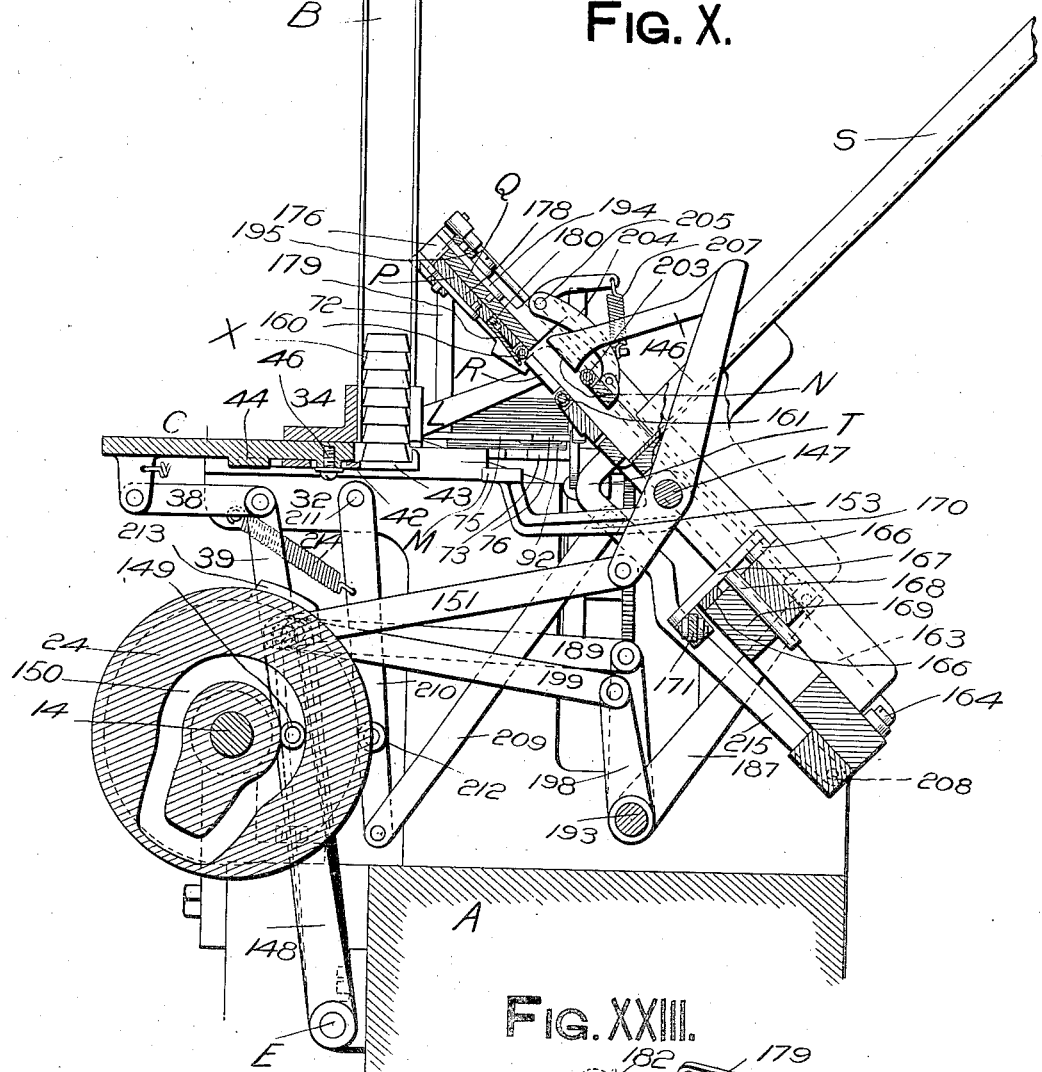

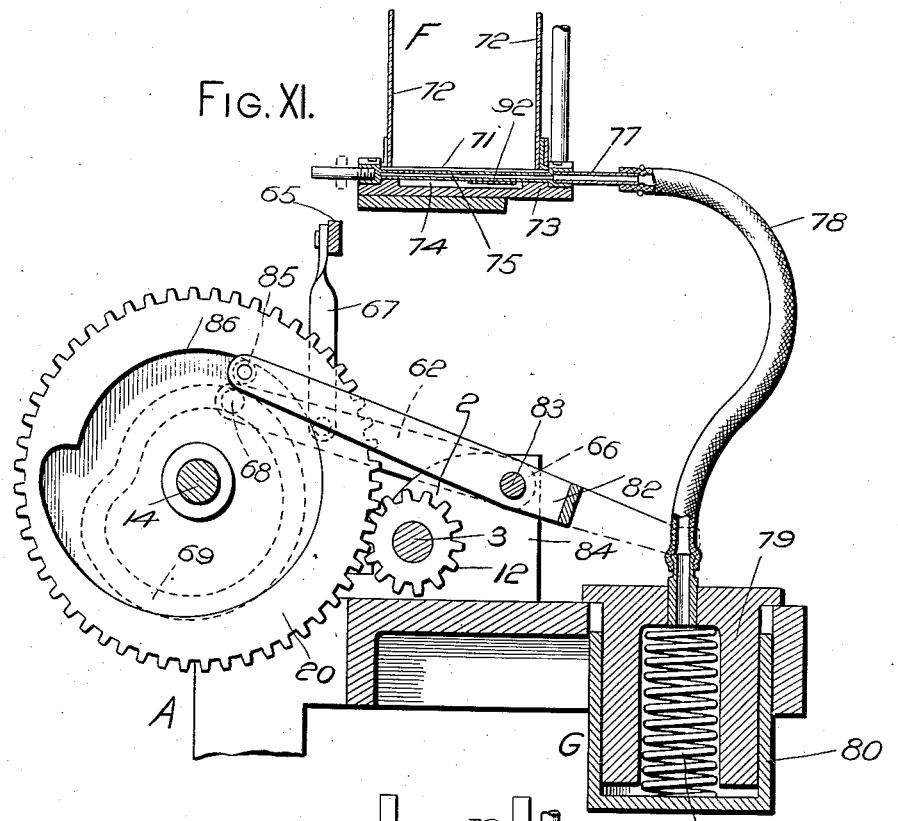
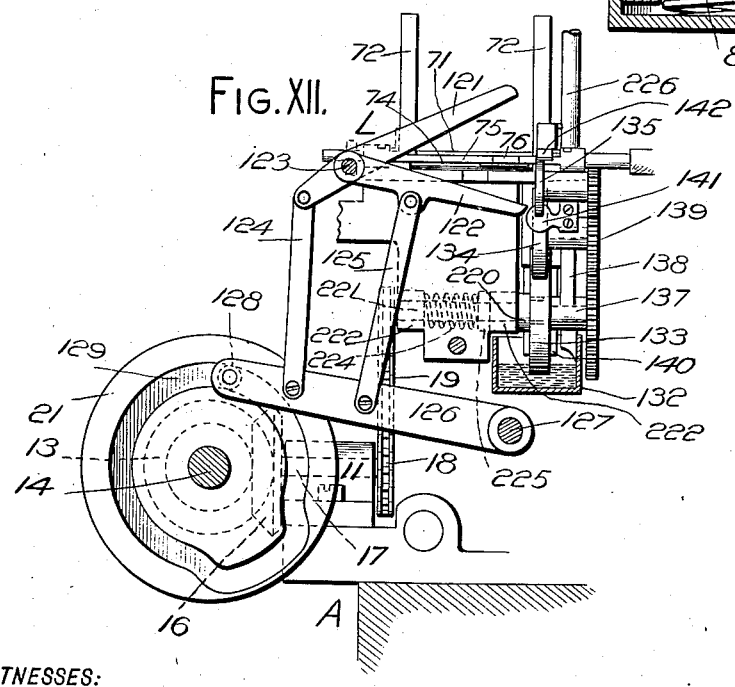

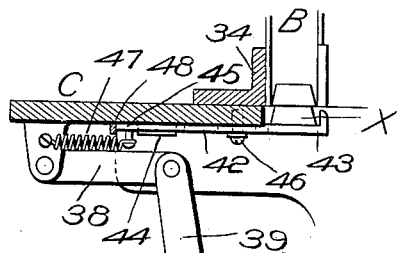
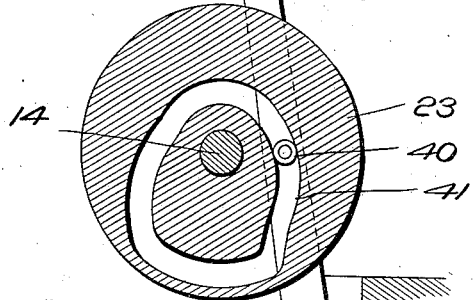
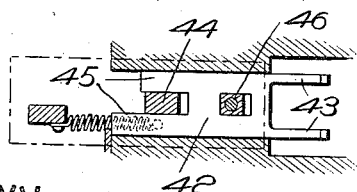
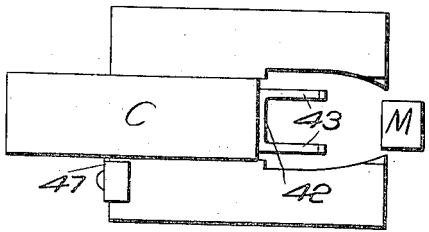
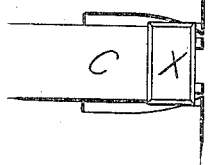

No. 895,945.
R. A. BERGER.
WRAPPING MACHINE.
APPLICATION FILED MAY 27, 1905.
PATENTED AUG. 11, 1908.
11 SHEETS—SHEET 9.
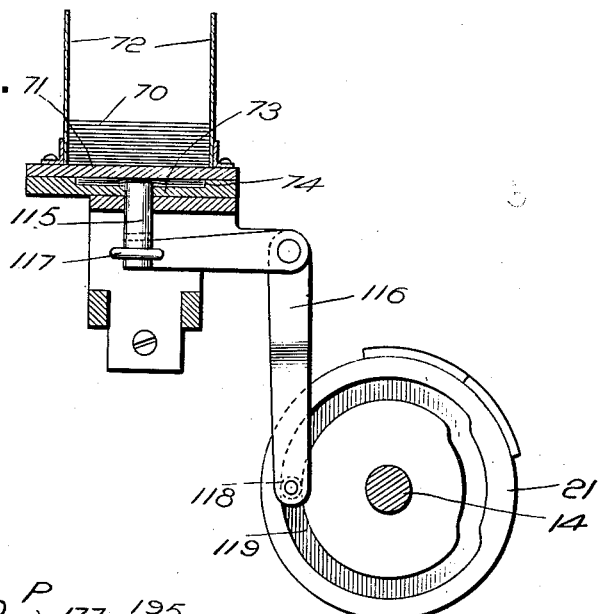
FIG. XIX.
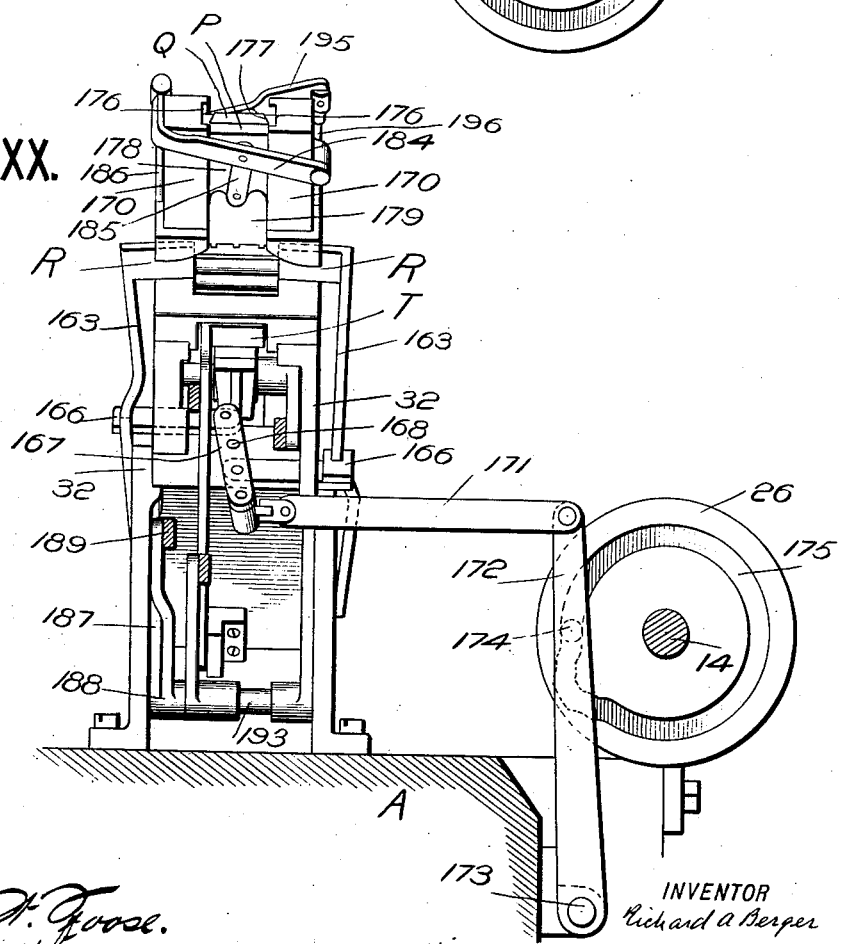
FIG. XX.
WITNESSES:
INVENTOR
Richard A. Berger
BY HIS ATTORNEY No. 895,945. PATENTED AUG. 11, 1908.
R. A. BERGER.
WRAPPING MACHINE.
APPLICATION FILED MAY 27, 1905.
11 SHEETS—SHEET 10.
FIG. XXIV.
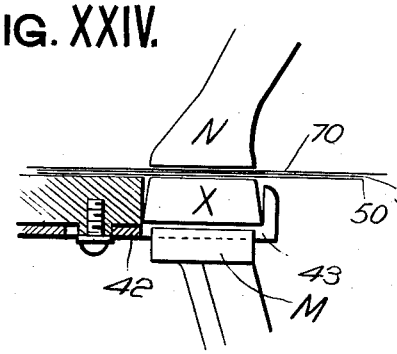
FIG. XXV.
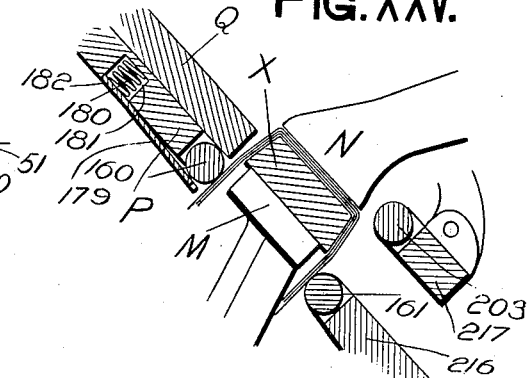
FIG. XXVI.
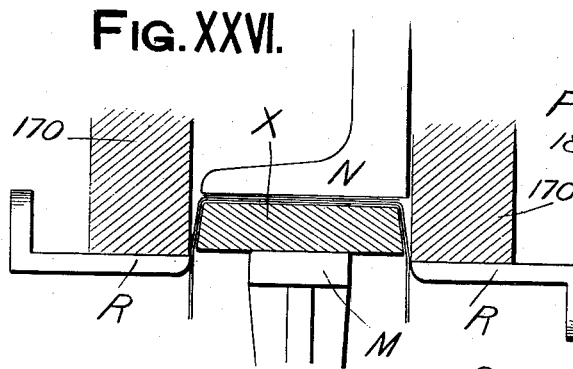
FIG. XXVIII.
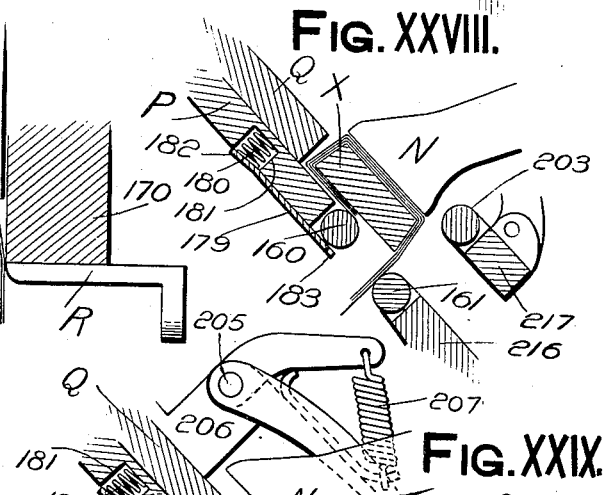
FIG. XXVII.
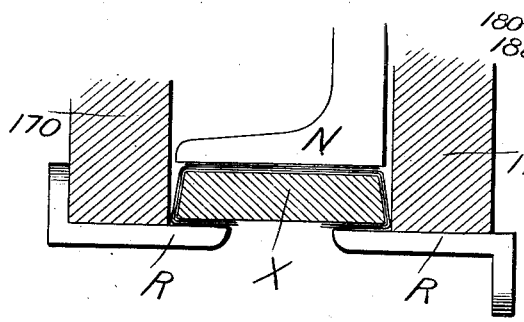
FIG. XXIX.
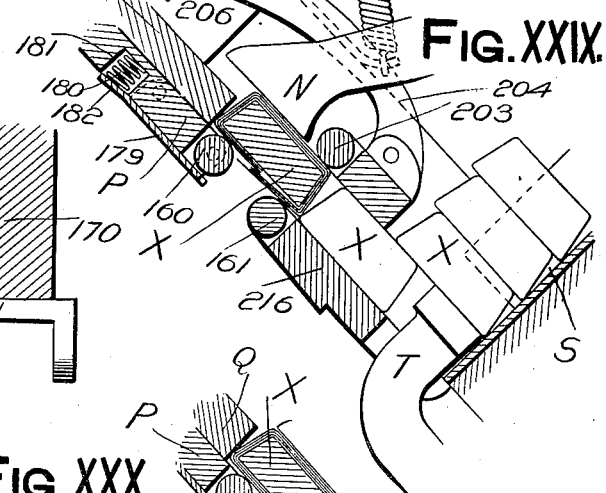
FIG. XXX.
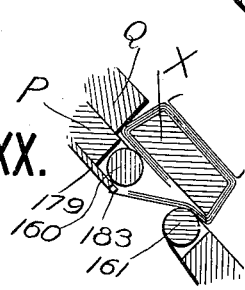
WITNESSES:
Allan H. Fgood.
M. B. Smith.
INVENTOR
Richard A. Berger
BY His ATTORNEY
Alfred Wilkinson No. 895,945. PATENTED AUG. 11, 1908.
R. A. BERGER.
WRAPPING MACHINE.
APPLICATION FILED MAY 27, 1905.
11 SHEETS—SHEET 11.
FIG. XXXI.
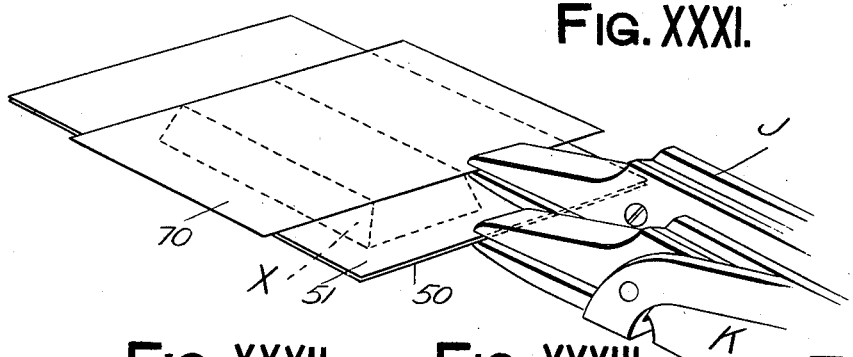
FIG. XXXII.    FIG. XXXIII.    FIG. XXXIV.
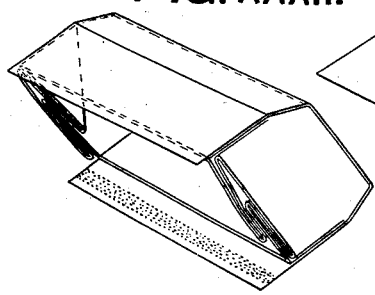 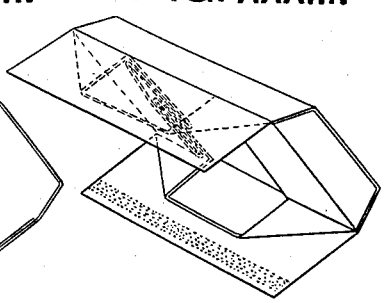 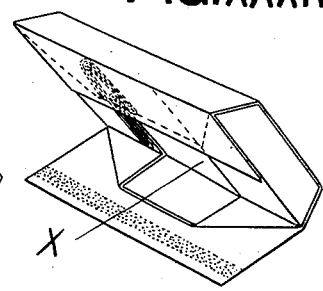
FIG. XXXV.
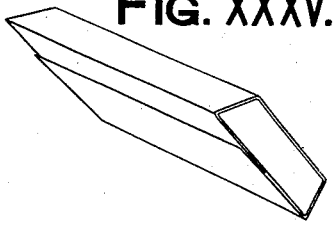
FIG. XXXVII.
FIG. XXXVI.
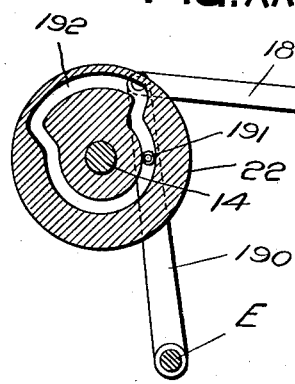 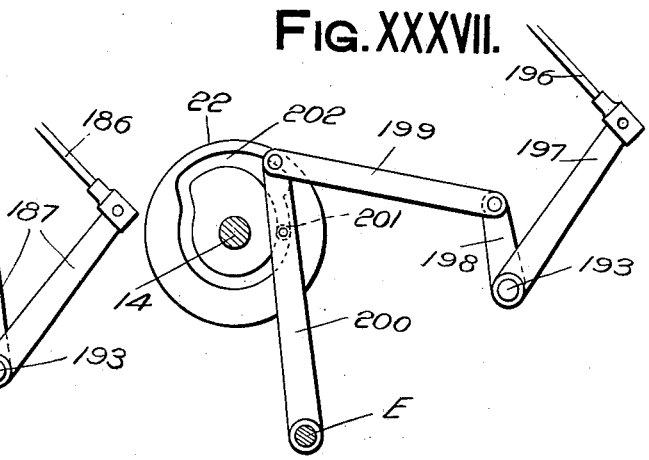
WITNESSES:
Allan H. Foose.
M. B. Smith.
INVENTOR
Richard A. Berger
BY HIS ATTORNEY
Alfred Wilkinson

UNITED STATES PATENT OFFICE.

RICHARD A. BERGER, OF BROOKLYN, NEW YORK, ASSIGNOR, BY MESNE ASSIGNMENTS, TO CONSOLIDATED WRAPPING MACHINE COMPANY, OF SPRINGFIELD, MASSACHUSETTS, A CORPORATION OF MASSACHUSETTS.

WRAPPING-MACHINE.

No. 895,945.  Specification of Letters Patent.  Patented Aug. 11, 1908.

Application filed May 27, 1905. Serial No. 262,612.

*To all whom it may concern:*

Be it known that I, RICHARD A. BERGER, citizen of the United States, residing at Brooklyn, in the county of Kings and State of New York, have invented certain new and useful Improvements in Wrapping-Machines; and I do hereby declare the following to be a full, clear, and exact description of the invention, such as will enable others skilled in the art to which it appertains to make and use the same.

My invention relates to package wrapping machines for automatically wrapping articles, such as chocolate, caramels, gum, soap and other articles of such a size, as to make it desirable to use automatic means for rapidly and securely inclosing them in their wrappers.

The special construction of machine shown and described is particularly adapted for the application of one or more inner wrappers and an outside binder, which is also commonly printed and decorated to afford an attractive label. A plurality of wrappers are preferably used, commonly two, such as wax paper for the inner wrapper, and metal foil for the outer wrapper. As wax paper protects the articles from contact with the foil, lead foil, which is much cheaper than tinfoil, may advantageously be used in such a machine.

My present machine is an improvement on other machines heretofore invented and patented by me, particularly the machine of my Letters Patent No. 643,621, dated Feb. 20, 1900.

The more important improvements in my machine are the entire rearrangement of the parts, so that most of the cams and other operative connections are arranged on the rear of the machine, leaving the front free and open for the operator; also in a much simpler mode of operating the fingers, and in an entire rearrangement thereof, so that the article is transferred by the fingers through a short arc of less than 90°, preferably only of 45° more or less. By this rearrangement, and the transferring of the article through a short arc or distance, the speed of operation is greatly increased. Also the folding and expelling mechanism is of a new construction and mode of operation, which is simple, positive and quick in operation, replacing a one-piece folding-box and more complicated movements. A feed slide has been devised, positively to grip the cakes, whereby danger of displacement is avoided. The gripping mechanism is simplified and more conveniently arranged, and the connections and operating parts of the machine have been simplified, rearranged and reduced in number with a great saving in construction, repairs, weight of machine, and by its greater simplicity a more effective and certain operation is obtained, with less lost motion and a greater speed of operation. Other details of the machine have been simplified and improved.

A desirable embodiment of my invention is shown in the drawings herewith, in which the reference letters and numerals of the specification indicate the corresponding parts in all the figures.

Figure I is a front elevation of my improved machine. Fig. II is an elevation from the left. Fig. III is a rear elevation. Fig. IV is a top plan. Fig. V is an enlarged vertical longitudinal section on line V of Fig. IV, to illustrate the construction and operation of the gripper mechanism, the strip clamping mechanism and the slackener mechanism, certain of the parts being omitted. Figs. VI, VII° and VIII are enlarged details of portions of Fig. V, showing the grippers and nozzle-leaf in different positions, and the lowest label drawn down by the nozzle-leaf into line with the label gripper. Fig. IX is a perspective view of the nozzle-leaf detached. Fig. X is a vertical cross section on line X of Fig. IV, to show the construction and operation of the feed-slide, the transferring fingers and the folding mechanism, with certain parts omitted. Fig. XI is a partial detail cross section enlarged of the nozzle-leaf, label box and pump mechanism. Fig. XII is an enlarged detail elevation taken from the left of the cutter mechanism and the gumming mechanism. Figs. XIII to XVIII are detail views of the delivery slide mechanism. Figs. XIII and XIV are vertical cross sections, showing the feed slide and its hook slide in different positions. Figs. XV and XVI are respectively top plan and parallel horizontal section of the feed slide, to show the relation thereto of its hook slide. Figs. XVII and XVIII illustrate the operation of said slides. Fig. XIX is an enlarged, detail view, principally in elevation, of the clamping mechanism taken from the right of the machine. Fig. XX is an enlarged, rear elevation of the folding mechanism, detached. Figs. XXI and XXII are respectively enlarged plan, and cross section, of the automatically adjusting connecting link for the lower finger. Fig. XXIII is an enlarged perspective view of a portion of the folder-slide detached. Figs. XXIV to XXX are enlarged details in section showing the steps of operation of the folding mechanism. Figs. XXXI to XXXV are enlarged perspective views to be read with the preceding sheet, showing the cake and envelops in the successive positions. Figs. XXXVI and XXXVII are details of the connections and cam, by which the folder-slide and the expeller-slide respectively are operated. Fig. XXXVIII is a chute attachment.

In the drawings, A indicates the bed-plate, which is preferably cast in one solid piece or otherwise suitably made, to provide a firm, solid base, supported on integral short legs as here shown, or on other suitable support. On this bed-plate are detachably secured by bolts the main uprights, side pieces, brackets and journal bearings, on which the different parts of the mechanism are respectively supported and journaled. These parts make up the supporting frame, which may be varied in arrangement and construction. The bed-plate may desirably be recessed at the left, on the rear and centrally, to obtain compactness in arrangement, or convenience in assembling, manipulation, etc., of the various parts.

I will first enumerate the more important cams, connections and other means, by which the various parts of the machine are automatically operated at the proper times to perform in turn the various operations for wrapping the articles of merchandise, whether in one cake, as in case of chocolate, caramels, soap or other articles, or in several pieces in a single package, as is commonly the case with gum. The article wrapped I will call the "cake." The various operations consist in first delivering the cake from the magazine to, or immediately over, the lower finger; then drawing out from the reels by a gripper the wrapper, which may desirably be double, for instance, wax paper for the inner wrapper and metal foil for the outer wrapper; severing the wrappers from the rolls or strips, from which they are drawn; simultaneously drawing out by a second gripper the binder, called the "label," and gumming one edge thereof; depositing said label centrally of the severed wrappers, and in proper position over the cake above the lower finger; gripping the cake, with the superposed wrappers and label, between the fingers; shifting it into the folding-box or folding-position, during which movement, and as it enters the folding-box, the four edges of the envelops are turned down against the edges of the cake; crimping in the downturned ends of the wrappers by the end-folders; folding down the rear flap of the wrappers and label by the folder-slide; then by the expeller-slide transferring the cake forward or downwardly one space during which movement it passes between a pair of rollers, of which the lower fixed roller presses down the front flap of the wrappers and the gummed flap of the label to complete the wrapping; the first cake is then pushed to the foot of the receiving chute by the following cake, and the cakes in the chute are raised by the lifter to permit the last wrapped cake to be moved in turn into the bottom of the chute. "Envelops" indicate collectively the wrappers and label.

*Operating mechanism* (Figs. II, III, IV, V).—In bearings 2 2 bolted on bed-plate A, is journaled the driving shaft 3, carrying the crank 4 for operation by hand, and the usual loose pulley 5 for the belt, when the machine is driven by power. The pulley is thrown into and out of connection with the shaft by means of usual clutch 6, connected to the shaft by usual feather and spline for this purpose, and shifted by clutch lever 7 provided with roller stud 8 engaging with clutch groove 9 on the clutch and having shifting handle 10. The clutch may be provided with pins fitting corresponding holes in pulley face, or provided with other means by which it is locked to the pulley when forced against it. The driving shaft carries, between the bearings 2 2, the pinion 12 meshing with main gear 20 on main shaft 14, journaled in suitable bearings 15 15 on the rear of the bed plate. Gear 20 is also a cam wheel, by which both the slackener and the suction pump are operated, respectively, by right cam groove and left cam ridge on said gear-cam-wheel. The main shaft also carries the cutter-cam-wheel 21, from which is operated the cutter, the clamping mechanism for the ends of the wrapper strips and the nozzle-leaf, respectively, by left and right cam grooves, and by edge cams; the slide-cam-wheel 22, operating the two slides for folding the flaps of the wrappers and label and for expelling the cake from the folding box to the chute, the folder-slide by right cam groove, and the expeller-slide by left cam groove; the feed-cam-wheel 23, operating the feed-slide for delivering the bottom cake from the magazine to position on or over the lower finger; the finger-cam-wheel 24, operating both fingers, the upper-finger by right cam groove, the lower-finger by left cam groove. 25 is the gripper-cam-wheel, operating the two sets of grippers to grip and draw out the wrappers and the label respectively, the label-gripper being reciprocated by front cam groove and the wrapper-gripper by rear cam groove on said wheel, and both grippers closed to grip by an edge cam on said wheel; 26 is the folding-cam-wheel, operating the end-folders simultaneously by one cam groove. Cam wheels 25 and 26 are secured on countershaft 27 journaled in bearings 28 28 and carrying beveled pinion 29 meshing with beveled pinion 30 on main shaft. The main shaft near its other end carries also a beveled pinion 13 meshing with beveled pinion 16 on short countershaft 17, journaled in a suitable bearing 11 on the bed - plate, and carrying sprocket-wheel 18 from which, by chain 19, the gummer or gumming wheels are operated. Said countershafts are preferably arranged at a right angle to the main shaft and are positively connected thereto as aforesaid. The various journal bearings should be provided with suitable oil holes as indicated, but not lettered, in Fig. IV.

*Delivery mechanism* (Figs. X, XIII to XVIII).—On main uprights 32 is bolted the magazine B composed of angular side pieces with flaring upper ends, spaced with slots between for easy manipulation of the cakes, and of a base 34, bridging a longitudinal slot in the top pieces of the main uprights, having rabbeted side edges, to which is fitted the feed-slide C having corresponding rabbeted edges. The cakes X, placed in the magazine by the operator, are delivered therefrom by the feed-slide, connected by link 38 to lever 39, journaled on cam lever shaft E, arranged at the rear of the machine, and provided with roller stud 40 engaging with cam groove 41 in cam wheel 23 to transfer the cakes in turn, as best shown in Fig. X, onto the lower finger M. This feed-slide C reciprocates also in a groove in magazine base, and carries on its lower surface hook-slide 42 having forwardly extending hooks 43, to receive and carry the cake, and to retain it against feed-slide front edge; the hook-slide is secured and maintained in position on the feed-slide by guide 44, projecting down from the feed-slide and fitting between rear forks 45 on the hook-slide, and by stud 46 fitting slot in said hook-slide, so that it is capable of a slight movement longitudinally on its feed-slide. Spring 47 is provided to draw the hook-slide back toward its feed-slide, whereby the cake is gripped between the tips of the hooks 43 and the front edge of the feed-slide, with a positive but gentle pressure. When in the rear position shown in Fig. XIII, the hook-slide is stopped by engagement of one of its rear forks 45, elongated for this purpose, with stop 48 on one of the main uprights 32, while the feed-slide finishes the short remainder of its rear movement, whereby is increased the space between the hook tips and the feed-slide, easily to receive the cake, which is immediately gripped, as the feed-slide starts forward, and carried forward to be placed immediately over the lower-finger M, then in initial, lowest position. It will be seen that both the fingers, M and N, have enlarged flat surfaces, the face of the upper finger preferably equal in area to the cake, but the face of the lower finger must be small enough to pass between the hooks and take the cake therefrom.

*Reels and slackener* (Figs. I, III, IV, V).— The strips of wax paper and of foil, from which respectively the inner and outer wrappers are cut, are respectively indicated by 50 and 51, and are preferably supplied to the machine from paper reel 52, journaled on the end of paper reel bracket 53, which may be bolted directly to the bed-plate, and from foil reel 54 on foil-reel bracket 55, which may be bolted on the side flange of label-box bracket 56, and braced by suitable brace. Adjacent to reel 55 is arranged a guide 57 for the wax paper, from which the two strips are drawn together over the slackener mechanism D, provided to draw off a slack portion of the wrapper strips so that this portion will hang loosely, and the strips be drawn out by the gripper without strain into position to be cut, for the strips would be torn if the grippers drew direct from the rolls on the reels. It will be understood that the slack portion is a little longer than the length of each wrapper drawn out at each movement by the gripper. This slackener mechanism consists of a rocking bar 58 having long pins 59 at each end, carrying antifriction rollers 60, preferably of wood, which is self polishing and self lubricating, for engagement with the united wrapper strips and on opposite sides thereof. This rocking bar is journaled at about its center on rocker pin 61, journaled in a suitable bearing (secured on the side flange of the label box bracket or on the reel bracket) and carrying at its rear end crank 63 connected by link 64 to upper slackener lever 65, pivoted on label box bracket, and reciprocated up and down to swing rocking bar back and forth through an angle of 45° more or less, by connecting rod 67 connected to main slackener lever 62, pivoted at 66, and having roller stud 68 on its rear end engaging with right cam groove 69 on cam-wheel 20. This cam groove is formed and timed to swing the rocking bar back to the position shown in dotted lines in Fig. V, and leave the slack portion of the double strips there shown free to be drawn by the gripper, without strain or danger of tearing.

*Label box and pump* (Figs. I, IV, V to IX, XI).—The labels 70 are preferably cut to size and usually printed and decorated in various colors; revenue stamps might be used as binders; they form the outer covering for the cake or bundle of cakes, and operate as gummed binders to secure the wrappers around the cakes; they are preferably of less width than the wrappers and not wider than the cake, as it is not necessary for their ends to be folded or crimped, but they are longer than the wrappers and have at least one of their end flaps extending beyond the wrapper flap in order to receive the gum; they are supplied to the label box F, composed of a bottom plate 71 and sides 72 having front flanges, carried on label box bracket 73 having a guide groove 74 underneath the box, through which the two strips of wrappers are drawn out and in which they are clamped by clamping mechanism H, hereinafter to be described. To the left-front, or discharge, edge of said bottom plate is hinged the hollow nozzle-leaf 75, having a notch 76 in its front thinner edge for the label-gripper J, holes through its flat upper surface communicating with its hollow interior and a nipple 77 at one end connected by flexible tube 78 to the vacuum pump G, arranged below the bed-plate and desirably composed of a stationary piston 79, to which is fitted the movable cylinder 80, connected by cylinder-rod 81, having hooked upper end, to pump lever 82, journaled at 83 on standard 84, and provided at its opposite end with roller stud 85, engaging within cam ridge 86 on left side of main gear 20, having notch at one point properly arranged and timed to permit the spring to act, so that the cylinder is first gradually drawn up on the fixed piston by the operation of this cam ridge and lever, and when the said roller reaches the enlargement or notch of the cam, the spring 87, arranged in the interior of the cylinder, is released and exerts an instantaneous pressure, forcing the cylinder suddenly away from the piston and creating a vacuum in the nozzle-leaf, then momentarily in its upper position, whereby the front edge of the lowest label in the box is sucked down against the surface of the nozzle-leaf, which is then rocked slightly down by means of its connected bell-crank-lever 83, pivoted at 89, and carrying on the end of its lower arm a roller stud 90, which engages with cams 91 on the edge of the cam wheel 21, whereby at the proper time the hinged nozzle-leaf is rocked downwardly carrying with it the front edge of the lowest label, to separate it from the other labels and bring it with certainty exactly into the path of the gripper J, then open to grip it and to draw it out into position onto the cake (Figs. VI, XI). Said cams 91 operate positively to rock the nozzle-leaf up and then down at the proper time. A small guard-plate 92 is secured on bottom plate 71 of label box immediately below notch 76 in nozzle to prevent the front edges of the wrapper strips turning up into the path of the label gripper.

It will be understood that the adjacent side edges of the nozzle-leaf and of the box bottom plate, one or both, are beveled so that the nozzle-leaf can swing downwardly as far as is necessary, but that in all positions their upper surfaces are continuous, so that no space or crack is left at the joint into which the edge of the label might accidentally be drawn, interfering with the correct continuous operation of the machine (Figs. VI, VII).

*Grippers* (Figs. V to VII, XXXI).—The label-gripper J and the wrapper-gripper K are similarly constructed, each of an upper jaw 94 and, pivoted thereto, a lower jaw 95. The upper jaws have their rear portions fitted to dove-tail grooves 25, 36, on the opposite sides of the gripper-frame 96 (Fig. II), on which the grippers are reciprocated to draw out the wrappers and the label over the cake sustained on the hooks in position to be taken therefrom by the fingers. The wrapper-gripper K is operated by lever 97 and the label gripper J by lever 98, operated respectively by cam grooves 99 and 100, respectively on front and on rear of cam wheel 25. Both of said levers are pivoted by their lower ends at the same point 102 on the base, are provided with similar roller studs 103 to engage with their respective cam grooves, and are connected to their respective grippers by similar links 104. The grippers are positively closed, by the engagement of integral closing extensions 105 on the lower jaws carrying roller studs 106 engaging with grooves 107 on the opposite sides of a rocking-frame 108 pivoted at 109 on gripper-frame 96. This rocking-frame is positively rocked down to close the jaws by the engagement of edge cam 110 on cam wheel 25 with a roller stud on the lower arm of bell-crank-lever 111, pivoted in the gripper-frame, and having its upper arm arranged in a groove in the gripper frame 96, and positively connected to the rocking-frame by link 112, which passes through a slot in the gripper-frame. When cam 110 is out of engagement with bell-crank-lever 111, spring 113 operates to rock up the rocking-frame and open the jaws, which must take place after the wrappers and labels have been drawn out and deposited on the cake; the jaws are then maintained open until they have been returned adjacent to the box to grip a new wrapper and label, or, strictly speaking, are opened wider as they return, the more easily to receive the edges of the wrappers and the label, by means of the upward inclination of rocking-frame 108 and its groove 107. When the grippers have closed respectively on the label and the wrapper, they are operated by the form of their respective cam grooves as follows: Wrapper-gripper K first moves back more quickly than label-gripper J, because the wrappers are longer than the label and must be moved further into proper position on the cake; as soon as gripper J has drawn the label clear of the cutter blades, gripper K pauses for a moment while the cut is being made; meanwhile gripper J continues to retract to bring the label centrally onto the wrappers and the cake; then both grippers retract together to clear the fingers, and open immediately after the fingers have seized the cake, then both retract further, fully to clear the lift, or swing, as the fingers swing to the folding-box. It will be observed that the dove-tail groove 35 for the label-gripper is inclined slightly downwardly, to bring the label, which its gripper takes at a higher point, down snug onto the wrapper on the cake.

*Wrapper strip clamp* (Figs. V, XIX).— After the wrapper strips have been drawn out to their full extent by the operation of the grippers J just described, these wrapper strips are positively clamped, so they may be severed by the cutter and the strips held against backpull by the slackener mechanism, until the grippers come back again for another wrapper, by means of a clamping mechanism H consisting of a clamp-pin 115, passing through an opening in the box bracket 73, preferably centrally arranged of guide groove 74, and clamping the strips against the bottom of the label box. This clamp-pin straddles the upper arm of bell-crank clamping lever 116 and is secured thereto by a long pin 117, which is made long to be conveniently removed when it is desirable to disconnect the clamp-pin, as in starting the machine and adjusting the strips in the groove. When this long pin is withdrawn, the clamp-pin drops slightly onto its lever arm, clear of the groove, and need not be removed. Said bell-crank lever has on its lower arm roller stud 118 engaging with right cam groove 119 on cam wheel 21; this groove is formed throughout its greater portion to hold clamp-pin up in engagement with the strips, and is timed to lower pin and release strips during the time that the strips are being drawn out by the grippers.

*Cutter* (Figs. III, VII, XII).—After the wrapper-gripper has drawn out a wrapper length and has paused, the clamp-pin is immediately operated to clamp the strips as aforesaid, and almost simultaneously the strips are severed by the cutter L immediately adjacent to the front edge of the box and of the nozzle-leaf, which cutter consists of upper and lower blades 121 and 122 pivoted at 123 and reversely connected by links 124 and 125 to cutter lever 126 pivoted at 127 and provided at its opposite end with roller stud 128 engaging in left cam groove 129 on cam wheel 21, so that they operate in opposition to each other like scissors.

*Gummer* (Figs. I, XII).—From gum pan 132, the gum is taken up on gum-pan wheel 133, thence transferred to transmitting wheel 134 and thence to gumming wheel 135, by which the gum is applied to the label. All of said wheels are carried on similar pins 136 fitted to suitable bearings 137 in gummer bracket 138 and connected by meshing gears 139, so that the wheels are positively rotated. This may desirably be done by clutch 220 on gummer shaft 221 in bearings on arms 222, outwardly extending from label box bracket, carrying upper sprocket 223, and driven by chain 19 from lower sprocket-wheel 18 on counter-shaft 17. Said clutch may be provided with pins to engage with corresponding holes on gum-pan wheel 133, and is held in engagement therewith by spring 224 arranged between one of said arms 222 and collar 225 on gummer shaft 211. The collar is arranged on its shaft to permit a rearward movement of the latter, when desired to release the clutch, as for removing the gumming mechanism as a whole, which is clamped in position beneath the label-box bracket by a single screw 226 having thumb-piece conveniently arranged.

On the gummer-bracket is arranged a scraper 140 to remove the surplus mucilage from the gum-pan wheel, before the mucilage is transferred to the transmitting wheel, and adjacent to the gumming wheel is a cleaner 141 to clean said gumming wheel, after it has applied the mucilage to the label. The mucilage is not applied to extreme edge of the label but in a line slightly back of the edge, to avoid danger of surplus mucilage being pressed out from beneath the flap on the exterior of the package (Figs. XXXII and XXXIV). A slightly resilient presser finger 142 is arranged on the label box opposite the third or gumming wheel to engage with the label and hold it down on the gumming wheel. The gum pan is secured in place by screw 227 so as to be conveniently detached for refilling (Figs. I and IV).

*Fingers or transferring mechanism* (Figs. II, XXIV–XXIX).—While the cake is being carried forward on the hooks over the lower finger M, carried on its shank 153 fixed on finger shaft 147, by the feed-slide mechanism before described, and the severed wrappers and label are being drawn out, and respectively cut and gummed, and deposited in proper position on the cake, the upper-finger N on shank 146, in form of a bell-crank-lever, loose on finger shaft 147, is swung down by the operation of upper-finger lever 148, journaled on cam lever shaft E and having roller stud 149 engaging with right cam groove 150 on finger-cam-wheel 24, 151 being the connecting link to lower extension on lower arm of bell-crank-lever, whereby the cake and envelops therefor are first gripped between the upper-finger N and the hooks. The lower-finger M then starts upwardly and passing between the hooks to engage with the under surface of the cake, so that the cake and its envelops are then gripped between the substantially parallel flat faces of the fingers, which are then swung together through a short arc into the folding position in folding-box formed by rollers and end-folders to be described, the upper-finger by the formation of its said cam groove, and the lower-finger carried on shank 153, fixed on shaft 147, by means of a crank 154 on outside end of shaft, link 155, lower-finger lever 156 also journaled at E and carrying roller stud 157 at its upper end engaging with cam groove 158 on the left side of cam 24. The lower-finger link 155 is preferably made compound so that the link may automatically elongate and permit a certain adjustment of the lower-finger. A desirable construction is shown in Figs. II, XXI and XXII, where the link is made in two parts, the shorter 230, fixed in guide 232, and the longer 231, fitted to move therein and held in position by spring 233; its movement is limited by stud 234, fitted to slot 235, and fixed in the guide. Such a construction is very desirable to permit the lower finger to adjust itself to variations in the thickness of the cake, and thereby avoid strain on the various parts of the machine. In Fig. III this link 155 is shown solid.

*Folding mechanism* (Figs. X, XX, XXIV to XXX).—In being swung by the fingers M N into the folding position as best shown in Fig. X, the cake with the superposed wrappers and label is carried between slide-roller 160 and lower fixed roller 161, and between the end-folders R, whereby the front and rear flaps of the wrappers and label and the ends of the wrappers are turned downwardly. The cake having now arrived in the folding-box, the end-folders R are swung in to crimp in the downwardly turned end edges so that they may be secured under the folded flaps of the label; the end-folders, carried on similar shanks 163 pivoted at corresponding points 164 on main uprights 32, are operated by the engagement with the shanks of the hooks 166 secured on the ends of the rocker-arm 167 at opposite sides of its bearing pin 168, journaled in cross-bar 169 between inclined side pieces 170 on main uprights. This rocker-arm is rocked to operate the end-folders by means of link 171 connected to end-folder lever 172 journaled by its lower end on the base at 173 and provided with roller stud 174 engaging with cam groove 175 on cam 26. The inward movement of the end-folders is timed to begin just before the retraction of the lower-finger, to hold the cake up in the box. The back flaps of the envelops are next folded down by the folder-slide P moving in grooves 176 in the side pieces 170, and the cake expelled from the folding box to the receiving chute by the expeller-slide Q, moving in the dovetail groove 177 in upper surface of slide P. The end-folders having crimped in the wrapper ends and begun to withdraw, pause for an instant and do not entirely disengage from the ends of the cake, until the folder-slide P has been moved forward to engage with the rear edge of the cake, whereby the cake is held up in the box. The movement of the folder-slide then continues, whereby its slide roller folds and holds down on the cake the rear flaps of the wrappers and the label. This folder-slide is preferably composed of a main portion 178, fitted to the grooves 176, and of a jacket 179, composed of a flat base and side flanges having pintles engaging with holes in the main portion and carrying in front of the folder-slide front edge the slide-roller 160, yieldingly held up in position by tension springs 180 in sockets 181 engaging with extensions 182 on the jacket behind the pintles, whereby a certain movement of the roller is permitted to adapt it to cakes of varying thicknesses. As the gummed flap of the label comes in contact with the front edge of this jacket, while the cake is being expelled from the folding-box, said jacket is notched, or provided with prongs 183, to avoid scraping from the label more than a small portion of the gum (Fig. XXX). This folder-slide is operated by link 185, connected to the angular lever 184, pivoted on the upper end of one of the side pieces, and connected to the right hand rod 186, arranged parallel to the side pieces, which is connected by folder-bell-crank lever 187 loose on shaft 193 and link 189 to folder-slide lever 190, carrying roller stud 191 engaging in groove 192 on right side of cam wheel 22. The expeller-slide Q is now timed to be operated by link 194, top lever 195, left parallel rod 196, connected to crank 197 fixed on shaft 193 carrying second crank 198 connected by long link 199 to expeller lever 200, journaled on shaft E and carrying roller stud 201 engaging in left cam groove 202 on cam-wheel 22, whereby the cake is expelled from the folding-box through the space between fixed bottom cross-bar 216 and top cross-bar 217, preferably provided with antifriction rollers 161 and 203, and the front flap of the wrappers and the front gummed flap of the label are pressed down and sealed and the wrapping completed. This top cross-bar 217 is carried on the lower arm of bell-crank-lever 204 fixed on pin 205 journaled in bearing 206 and is held down yieldingly against the cake by spring 207 connected to lever upper arm, whereby the cake is held with sufficient pressure against roller 161 to make the fold, and yet the top cross-bar and its roller are permitted to yield to allow for variations in the thickness of the cake.

*Lifter, chute* (Figs. II, X, XXIX, XXXVIII).—Each cake as it is expelled from the folding-box remains between the cross-bars until it is forced by the following cake to the chute S, in which the preceding cakes are raised by the lifter T to permit the succeeding cake in turn to take the lowest position in the chute. The lifter is on the rear end of lifter-shank 215, pivoted at 208 at the lower end of the side pieces, and is connected by long lifter link 209 to its operating lifter lever 210, pivoted at its upper end at 211, and having roller stud 212 held by spring 214 in engagement with cam 213 on edge of cam wheel 22 (Fig. X). The lifter is timed to raise the cakes in the chute and to retire just as the expelling slide brings the front edge of the last cake under rear edge of preceding cake (Fig. XXIX).

In Figs. II and XXXVIII is shown a desirable attachment for the chute end, by which the boxes, in which the wrapped cakes are packed, may be filled directly from the chute, avoiding an extra handling of the cakes, and enabling one operator to run two or more machines, because a box filled with cakes is handled, instead of the separate cakes. 240 indicates the box adapted to be slipped over the end of the chute, with its inner end 241 open and down-turned, where it is held by clamping-spring 242, or similar means, which also limits the extent of engagement of box and chute. On the chute side flange above the box is arranged a scale 243, or measuring bar, which may be graduated to indicate the number of cakes, packages of gum, etc., required to fill the box of standard size for the articles in question, for instance ten, fifty, one hundred. The cakes are fed up, or out, of the chute into the box, and when the box is filled, the operator separates by one hand the cakes in the box from those left in the chute, withdraws the box, turns up the inner end, puts on the cover and arranges another box on the chute end, all of which can be performed rapidly, as is necessary with these fast running machines.

It will be understood that I have illustrated a cake of a form common in the manufacture of chocolate, but it will be understood that the parts of my machine may be modified in size and proportions, to wrap articles of any ordinary size and shape.

*Conclusion.*—The mode of operation will be understood from the description, but it should be noticed particularly, that I have produced a new machine, so constructed that several of the operations take place simultaneously, for instance, the feed-slide is delivering the cake at the same time that the grippers are drawing out the envelops; while the cutter is operating, the label gripper is arranging the label centrally; as the end-folders operate, the lower-finger returns to its initial position; while the folder-slide and the expeller are operating, a new cake and envelops are being arranged over the lower-finger in position for the returning upper-finger; the expeller operates to expel the cake from the folding-box and simultaneously to fold down the front flap. By these new principles and modes of operation, and by the new feature of the transferring of the cake by the fingers through the shortest distance practical, the speed of operation has been greatly increased.

Having thus described my invention, what I claim as new and desire to secure by Letters Patent, is:—

1. In a wrapping machine, the combination with a folding mechanism and a transferring mechanism, of means to deliver the cake to be wrapped and the envelops therefor to the transferring mechanism, said folding mechanism being arranged at an angle not substantially greater than 45° to said delivering means, and of means to move the transferring mechanism through said angle, whereby the cake and envelops are delivered to the folding mechanism.

2. In a wrapping machine, the combination with a magazine for the cakes to be wrapped, of transferring fingers, a feed slide to deliver the cakes in succession to the fingers, means to deliver the envelops for the cakes to the fingers, a folding mechanism arranged in front of and at a higher level than the feed slide and envelop delivering means, and means to swing the fingers through an arc of less than 90° to deliver the cake and envelops to the folding mechanism.

3. In a wrapping machine, the combination with a supporting frame, of two coöperating transferring fingers, means to deliver the cake to be wrapped to the fingers, reels for the rolls of wrapper strips, means to draw out a slack portion of the strips, a box for the separated labels, two grippers to draw out the wrappers and the labels and place them in position on the cake, means to apply gum to one edge of the labels, means to sever the wrappers from the strips, means to fold down the four edges of the envelops onto the cake, said folding means being arranged at an angle not substantially greater than 45° to said delivering means and means to swing the fingers holding the cake and the wrappers through said angle to deliver the cake and the wrappers to the folding means.

4. In a wrapping machine, the combination with a bed-plate, of parallel, main uprights thereon, upwardly and rearwardly inclined side pieces on the respective uprights, a folding mechanism on the inclined side pieces for folding the envelops onto the cake, a feed slide arranged on the main uprights at a lower level than the folding mechanism, a lower finger journaled on the side pieces and arranged initially at a lower level than the feed slide, a magazine to deliver the cakes downwardly to the feed slide, means to move the feed slide forwardly and horizontally to deliver each cake successively over the lower finger, an upper finger journaled on the side pieces, and means to swing the fingers coöperatively first to grip the cake and envelops and then to deliver them upwardly and forwardly to the folding mechanism.

5. In a wrapping machine, the combination with a supporting base, of a magazine to deliver the cakes downwardly, a feed slide arranged below the magazine and adapted to receive the cakes therefrom, a lower finger journaled on the frame, means to move the feed slide substantially horizontally and forwardly to deliver each cake over the lower finger, means to deliver the envelops to the cake, an upper finger journaled on the frame, folding mechanism arranged at an angle of less than 90° to the feed slide, and means to move the fingers reversely to grip the cake and the envelops and then to move the fingers together to transfer the cake and envelops through said angle to the folding mechanism.

6. In a wrapping machine, the combination with a magazine and a folding mechanism, of an upper and a lower finger, shanks for the fingers journaled on a common axis, means for delivering a cake between the fingers, means for drawing out the envelops onto the cake, a cam-wheel, means to support and to rotate the cam-wheel, upper and lower finger levers carrying roller studs engaging with cam grooves on the opposite sides of the cam-wheel, and links connecting the finger levers directly to the respective finger shanks, whereby the fingers are operated to grip the cake and the envelops to transfer them to the folding mechanism.

7. In the transferring mechanism of a wrapping machine, the combination with a suitable supporting frame, of a finger-shaft journaled on the frame, a lower-finger shank fixed on the shaft, a lower-finger on the shank, a crank fixed on the shaft, a cam-wheel suitably journaled on the frame, a lower-finger lever pivotally supported on the frame, a roller-stud on said lever engaging with a suitable cam groove on one face of the cam-wheel, a lower-finger link connecting said crank to the lower-finger lever, an upper-finger shank in the form of a bell-crank-lever mounted loosely on said finger-shaft, an upper-finger on the upper arm of said bell-crank-lever, an upper-finger lever pivotally supported on the frame, a roller-stud on said upper-finger lever engaging with a suitable cam groove on one face of said cam-wheel, an upper-finger link connecting said upper-finger lever with the lower arm of said bell-crank-lever, said lower-finger link being composed of two sections held together by a tension spring, permitting elongation of the link and automatic adjustment of the lower-finger to variations in the cakes to be wrapped, and means to rotate the cam-wheel to move the fingers to engage with the cake and envelops and to transfer the cake and envelops to a folding mechanism.

8. In a wrapping machine, the combination with a suitable supporting frame, of a finger-shaft journaled on the front part of the frame, a rearwardly extending lower-finger shank fixed on the shaft, a lower-finger having a flat upper face on the rear end of said shank, a crank on one end of said shaft, a cam-wheel on a suitable main shaft journaled in the rear of the machine, a lower-finger lever pivotally supported at its lower end on a cam-lever-shaft on the rear of the frame, a roller-stud on said lower-finger-lever engaging with a suitable cam groove on the left face of the cam-wheel, a lower-finger link connecting the end of said crank to the upper end of the lower-finger lever, an upper-finger shank in the form of a bell-crank-lever mounted loosely on said finger-shaft, an upper-finger on the upper arm of said bell-crank-lever, an upper-finger lever pivotally supported at its lower end on said cam-lever-shaft, a roller-stud on said upper-finger lever engaging with a suitable cam groove on the right face of said cam-wheel, an upper-finger link connecting the upper end of said upper-finger lever with an extension on the lower arm of said bell-crank-lever, said lower-finger link being composed of a guide, a shorter section fixed in the guide, a longer section free to move longitudinally in the guide, a tension spring to engage with the longer section and hold it in normal position and a stud engaging in a slot to limit the movement of the longer section, whereby elongation of the link is permitted and automatic adjustment of the lower-finger to variations in the thickness of the cakes to be wrapped, a feed-slide having forwardly extending hooks to receive the cake, means to move the slide to deliver the cake over the lower finger, means to draw out the envelops and place them on the cake, a folding mechanism and means to rotate the main shaft, whereby the upper-finger is first swung down to engage with the envelops and cake, the lower-finger swung up between the hooks to engage with the cake, both fingers swung upwardly and forwardly together to deliver the cake and envelops into the folding-box of the folding mechanism, and the lower-finger returned to initial position while the upper-finger remains in position to form an upper surface to the folding-box, substantially as described and shown.

9. In a wrapping machine, the combination with a supporting frame, of elements supported thereon and arranged to form the four sides of a folding-box of a suitable size to receive the cake and the envelops therefor, means to transfer the cake and its envelops into the folding-box whereby the edges of the sheets engage with the four sides of the box as the cake is moved into the box and are turned against the edges of the cake, means to crimp in the end folds of the envelops, means to fold down the back flaps of the envelops and means simultaneously to expel the cake from the box and to fold down the front flaps of the envelops.

10. In a wrapping machine, the combination with a supporting frame, of elements supported thereon and arranged to form the four sides of a folding-box, means to transfer the cake and its envelops upwardly and forwardly into the folding-box whereby the four edges of the sheets engage with said elements forming the four sides of the box and are turned down against the edges of the cake, means to fold the envelops onto the cake at three sides and means simultaneously to expel the cake from the folding-box and to fold down the envelops at the fourth side.

11. In a wrapping machine, the combination with a supporting frame, of operative elements supported thereon and arranged to form the four sides of a folding-box of suitable size to receive the cake and the envelops therefor, a magazine, means to feed the cakes in succession from the magazine to a transfering mechanism, means to deliver the envelops in flat sheets onto the successive cakes, the transferring mechanism to grip the cake and envelops and swing them into the folding-box whereby the four edges of the envelops engage with the four sides of the box as the cake enters the box and are turned against the edges of the cake, means to crimp in the end folds of the envelops, means to fold down and to hold down the back flaps of the envelops over the end folds, and means simultaneously to expel the cakes from the box and to fold down the front flaps of the envelops.

12. In a wrapping machine, the combination with a suitable supporting frame, of an expeller slide, an expeller-slide fitted to move on the frame parallel and adjacent to the folder slide, top and bottom cross-bars on the frame, end-holders arranged on each side between the slides and the cross-bars, said slides, cross-bars and end-folders forming a folding-box, means to deliver the cake and the envelops therefor to the folding-box, means to move the end-folders to crimp in the end folds, means to move the folder-slide to fold the back flaps, and means to move the expeller-slide to expel the cake from the box between the cross-bars.

13. In a wrapping machine, a folding mechanism having in combination side pieces supported on a suitable base, a folder-slide fitted between the rear ends of the side pieces, an expeller-slide fitted to the upper surface of the folder-slide, top and bottom cross-bars on the side pieces in front of the slides, end-folders arranged on each side between the slides and the cross-bars, said slides, cross-bars and end-folders forming a folding-box of a suitable size to receive the cake and the envelops therefor, said top cross-bar being loosely mounted on the side pieces and held down by a tension spring, means to move in the end-folders to crimp the ends of the envelops, means to move forward the folder-slide to fold down the back flaps of the envelops, and means to move forward the expeller-slide to expel the cake from the folding-box through an opening between the cross-bars.

14. In a wrapping machine, a folding mechanism having in combination inclined side pieces supported on a suitable base, a folder-slide fitted to grooves in the rear end of the side pieces, an expeller-slide fitted to grooves in the upper surface of the folder-slide, top and bottom cross-bars on the side pieces in front of the slides, end-folders arranged on each side substantially to span the space between the slides and the cross-bars, said slides, cross-bars and end-folders forming a folding-box, open below, and of a size suitable to receive the cake and the envelops therefor, said top cross-bar being loosely mounted on the side pieces and held down by a tension spring, means to move in the end-folders to crimp the ends of the envelops, means to move forward the folder-slide to fold down the back flaps of the envelops, and means to move forward the expeller-slide to expel the cake from the folding-box through an opening between the cross-bars.

15. In a wrapping machine, the combination with a bed-plate and side pieces thereon, of a folder-slide supported between the rear ends of the side pieces, a roller on the front edge of the folder-slide, an expeller-slide supported on the folder-slide, top and bottom cross-bars between the side pieces, a roller on the rear edge of the bottom cross-bar, a roller on the rear edge of the top cross-bar, opposite end-folders arranged between the folder-slide roller and the bottom cross-bar roller, said slides, cross-bar rollers and end-folders forming a folding-box to receive the cake and its envelops, means to deliver the cake and its envelops into the folding-box, whereby the edges of the envelops are turned downwardly, means to move inwardly the end-folders to crimp in the ends of the envelops, means to move the folder-slide to fold down the rear flaps of the envelops, and means to move the expeller-slide to expel the cake between the cross-bar rollers and thereby fold down the front flaps.

16. In a wrapping machine, the combination with a bed-plate and side pieces thereon, of a folder-slide supported between the rear ends of the side pieces, a tension roller on the front edge of the folder-slide, a spring to draw said roller upwardly, an expeller-slide supported on the folder-slide, top and bottom cross-bars between the side pieces, arranged in front of and parallel to the slide ends, an antifriction roller on the rear edge of the bottom cross-bar, a tension roller on the rear edge of the top cross-bar, opposite end-folders arranged between the folder-slide roller and the bottom cross-bar roller, said slides, cross-bar rollers and end-folders forming a folding-box to receive the cake and its envelops, means to deliver the cake and its envelops into the folding-box, whereby the edges of the envelops are turned downwardly, means to move inwardly the end-folders to crimp in the ends of the envelops, means to move forward the folder-slide to fold down the rear flaps of the envelops, and means to move forward the expeller-slide to expel the cake between the cross-bar rollers and thereby fold down the front flaps.

17. In a wrapping machine, the combination with side pieces suitably supported, of a folder-slide and an expeller-slide supported and moving between the rear ends of the side pieces, top and bottom cross-bars on the side pieces in front of the slides, end-folders on the side pieces having their tips arranged between the slides and the cross-bars, said slides, cross-bars and end-folders being arranged to form a folding-box having an opening between the folder-slide end and the bottom cross-bar for the admission of the cake and envelops therefor and an opening between the top and bottom cross-bars for the expelling of the cake inclosed in its envelops, upper and lower oscillating fingers suitably journaled to deliver the cake to the folding-box, said upper-finger forming an upper wall for the folding-box while the folds in the envelops are being formed, means to deliver the cake and envelops to the fingers, means to swing the fingers to grip the cake and envelops and to transfer them into the folding-box, means to swing in the end-folders to crimp the ends of the envelops, means to move the folder-slide to fold the rear envelop flaps, and means to move the expeller-slide to expel the cake between the cross-bars.

18. In a wrapping machine, the combination with a base plate, of side pieces thereon, a folder-slide fitted to move between the side pieces, an expeller-slide fitted to move on the folder-slide, top and bottom cross-bars on the side pieces in front of the slides, end-folders arranged on the sides between the slides and the cross-bars, said slides, cross-bars and end-folders forming a folding-box to receive the cake, means to feed the successive cakes, means to deliver the envelops onto the cakes, means to transfer the cakes and envelops into the folding-box, means to move in the end-folders below the cake in the folding-box to crimp the ends of the envelops and thereafter to retract the end-folders, means to move forward the folder-slide under the cake to fold the rear flap of the envelops, said folder-slide being timed to engage with the cake before the end-folders have fully retracted, and means to move forward the expeller-slide while the folder-slide is in its forward position, to expel the cake from the folding-box through an opening between said top and bottom cross-bars and thereby fold down the front flaps of the envelops.

19. In a wrapping machine, the combination with a base plate, of side pieces thereon, a folder-slide fitted to move in grooves between the side pieces, an expeller-slide fitted to move in grooves in the folder-slide, top and bottom cross-bars on the side pieces in front of the slides, end-folders arranged on the sides between the slides and the cross-bars, said top cross-bar being loosely mounted on the side pieces and held down by a tension spring, said slides, cross-bars and end-folders forming a folding-box to receive the cake from below, means to feed the successive cakes, means to deliver the envelops onto the cakes, means to transfer the cakes and envelops from below into the folding-box, whereby the edges of the envelops are turned down on the edges of the cake, means to move in the end-folders, means to move forward the folder-slide, and means to move forward the expeller-slide to expel the cake from the folding-box through an opening between said top and bottom cross-bars and thereby fold down the front flaps of the envelop.

20. In a wrapping machine, the combination with a bed-plate, parallel main uprights thereon and upwardly and rearwardly inclined parallel side pieces supported on the respective uprights, of a folder-slide fitted to grooves on the inner edges of the rear ends of the side pieces, a roller on the front edge of said slide, an expeller-slide fitted to dove-tail grooves on the upper surface of the folder-slide, a bottom cross-bar fixed between the side pieces in front of and parallel to said slide-roller, a roller on the rear edge of said cross-bar, a top cross-bar, a roller on the rear edge of said top cross-bar, flat end-folders arranged in grooves in the side pieces and adapted substantially to span the space between the forward ends of the slides and the cross-bar rollers, said slide ends, cross-bar rollers and end-folders arranged in said grooves forming the four walls of a folding-box, an upper- and a lower-finger journaled on a common axis, cam operated means connected to the fingers first to swing the fingers toward each other to grip the cake and superposed envelops, then to swing the fingers upwardly and forwardly through a short arc to deliver the cake and envelops into the folding-box, whereby the four edges of the envelops are turned down on the edges of the cake, and then return the lower-finger to its initial position, while the upper-finger remains in upper position to form an upper surface between the four walls of the folding-box, cam operated means connected to the end-folders to swing in said end-folders below the cake in the folding-box to crimp in the ends of the envelops and then to retract the end-folders, cam operated means connected to the folder-slide to move forward the folder-slide below the cake to fold down the envelop rear flaps, and cam operated means connected to the expeller-slide to move forward said expeller-slide to expel the cake between the cross-bar rollers, substantially as described and shown.

21. In a wrapping machine, the combination with a bed-plate, parallel main uprights thereon and upwardly and rearwardly inclined parallel side pieces supported on the respective uprights, of a folder-slide fitted to grooves on the inner edges of the rear ends of the side pieces, a roller journaled on the front edge of said slide, an expeller-slide fitted to dove-tail grooves on the upper surface of the folder-slide, a bottom cross-bar fixed between the side pieces in front of and parallel to said slide-roller, a roller on the rear edge of said cross-bar, a top cross-bar, a roller on the rear edge of said top cross-bar, end-folder shanks pivoted on the lower ends of the side pieces, flat end-folders on the rear ends of said end-folder shanks arranged in grooves in the side pieces and adapted substantially to span the space between the forward ends of the slides and the cross-bar rollers, said slide ends, cross-bar rollers and end-folders forming a folding-box, an upper and a lower-finger journaled on a common axis, cam operated means connected to the fingers first to swing the fingers toward each other to grip the cake and superposed envelops, then to swing the fingers upwardly and forwardly through a short arc to deliver the cake and envelops into the folding-box, whereby the four edges of the envelops are turned and folded down on the edges of the cake, and then to return the lower-finger to its initial position, while the upper-finger remains in upper position to form an upper surface between the four walls of the folding box, a receiving chute, for the wrapped cakes, supported on the side pieces below and forwardly of the folding-box, a lifter arranged below the lower end of the chute, means to swing in the end-folders below the cake in the box to crimp in the ends of the envelops, means to move forward the folder-slide below the cake to fold down the envelop rear flaps, means to move forward the expeller-slide to expel the cake between the cross-bar rollers, means to operate the lifter to lift the cakes in the chute and permit the last wrapped cake to move into the lowest position in the chute, substantially as described and shown.

22. In a wrapping machine, the combination with a bed-plate, parallel main uprights thereon and upwardly and rearwardly inclined parallel side pieces supported on the respective uprights, of a folder-slide fitted to grooves on the inner edges of the rear ends of the side pieces, a roller journaled at the front edge of the slide, an expeller-slide fitted to dove-tail grooves on the upper surface of the folder-slide, a bottom cross-bar fixed between the side pieces in front of and parallel to said slide-roller and at a distance from the slide-roller sufficient to admit the cake, a roller on the rear edge of said cross-bar, a top cross-bar, a roller on the rear edge of said top cross-bar, a bell-crank lever journaled on one side piece and carrying the top cross-bar on its lower arm, a spring connected to the upper arm of said bell-crank lever and adapted to hold said top cross-bar roller down against the cake with a yielding tension as the cake is being expelled edgewise between the cross-bar rollers, said cross-bars having their adjacent faces arranged parallel and on substantially the same incline as the side pieces to form a channel through which the cakes pass toward the receiving chute, end-folder shanks pivoted on the lower ends of the side pieces, flat end folders on the rear ends of said end-folder shanks arranged in grooves in the side pieces and adapted substantially to span the space between the forward ends of the slides and the cross-bar rollers, said end-folders being arranged substantially on the same incline as the side pieces, said slide ends, cross-bar rollers and end-folders forming a folding-box, an upper-finger and a lower-finger journaled on a common axis, means to operate the fingers to deliver the cake and envelops into the folding box, a receiving chute, to receive the wrapped cakes, fixed on the side pieces at a point adjacent to the folding-box and below and forwardly thereof, and extending upwardly and forwardly substantially at a right angle to the inclined side pieces, a lifter-shank pivoted on the front, lower ends of the side pieces, a lifter on the rear end of the lifter-shank having a flat face arranged substantially in the plane of the bottom cross-bar face and below the lower end of the chute to receive the cakes in succession, cam operated means connected to the end-folder shanks to swing in the end-folders below the cake in the box to crimp in the ends of the wrappers and thereafter to retract the end-folders, cam operated means connected to the folder-slide to move forward the folder-slide below the cake to fold down the envelop rear flaps and to retract the folder-slide after the cake has been expelled, cam operated means connected to the expeller-slide to move forward the expeller-slide to expel the cake between the cross-bar rollers and then to retract the expeller-slide, the movement of said slides being substantially parallel to the inclined side pieces, and cam operated means, connected to the lifter, to elevate the cakes in the chute, to permit the last wrapped cake to move into the lowest position in the chute, substantially as described and shown.

23. In a wrapping machine, a folder-slide and a sheet metal jacket fitted around the lower portion of said folder-slide and having a flat base, side flanges extending upwardly and at right angles to its flat base, opposite pintles on the flanges engaging with holes in the side edges of the slide, springs arranged in sockets in the lower surface of the slide engaging with rear extensions on the flat base of the jacket at the rear of the pintles, a roller journaled between said side flanges and arranged in front of the front edge of the slide, and integral short prongs on said base to engage with the gummed flap of the label.

24. In a wrapping machine, the combination with a bed-plate, main uprights thereon, and inclined side pieces on the uprights, of a folder-slide and an expeller-slide supported on and moving between the rear ends of the side pieces, a sheet metal jacket fitted to the folder-slide and journaled thereon, a roller journaled on the jacket and arranged in front of the lower edge of the slide, a tension spring to force the roller upwardly, integral short prongs on the jacket extending beyond said roller to engage with the gummed portion of the label, top and bottom cross-bars on the side pieces below the slides, rollers on the rear edges of said cross-bars parallel to the folder-slide roller, end-folders pivoted on the side pieces and having their ends substantially spanning the spaces between the folder-slide roller and the bottom cross-bar roller, said slides, cross-bars and end-folders being arranged to form the four walls of a folder-box, having an opening between the folder-slide and the bottom cross-bar for the admission of the cake and the envelops, and an opening between the top and bottom cross-bars for the expelling of the cake, means to deliver the cake and its envelops to the folding-box whereby the edges of the envelops are turned down, means to move the end-folders to crimp in the ends of the envelops, means to move the folder-slide to fold down the rear flaps of the envelops and means to move the expeller-slide to expel the cake from the box and simultaneously to fold down the front flaps of the envelops.

25. In a wrapping machine, the combination with a supporting frame, of a reel on the frame for the wrapper strip to form the inner envelop, a label box for the separated labels to form the outer envelop, means for successively feeding the cakes from the magazine, a wrapper gripper to grip the wrapper strip extending through a slot under the label box and to draw out each wrapper cut from said strip into position over the cake, a cutter to cut each wrapper from the strip, a label gripper to grip the labels and to draw out the labels into position, a folding mechanism to fold the envelops on the cake and means to deliver the cake and said envelops to the folding mechanism, said wrapper gripper being moved horizontally while drawing out the wrapper and said label gripper being moved in a downwardly inclined path while drawing out the label, whereby the label is delivered snugly onto the wrapper resting on the cake.

26. In a wrapping machine, the combination with a supporting frame, of a magazine for the cakes to be wrapped supported on the frame and extending upwardly therefrom, a lower-finger suitably journaled and arranged initially below and in front of the lower end of the magazine, a feed-slide arranged to reciprocate below the magazine, over the lower-finger, a hook-slide fitted to the feed-slide and having hooks on its outer end extending initially below the magazine, a spring to draw the hook-slide toward the feed-slide, whereby the hooks and feed-slide front edge will grip the cake, means to separate the hooks from the feed-slide front edge to receive the cake, means to move the feed-slide to bring the cake immediately over the lower-finger, means to deliver the envelops into position on the cake over the lower-finger, an upper-finger suitably journaled, a folding mechanism, and means to operate the fingers to grip the cake and wrappers and deliver them from the feed-slide to the folding mechanism.

27. In a wrapping machine, the combination with a supporting frame, of a vertically and upwardly extending magazine for the cakes supported on the upper portion of the frame, a lower-finger suitably journaled and arranged initially below and in front of the lower end of the magazine, a horizontal feed-slide arranged immediately below and initially behind the lower end of the magazine and adapted to be moved forward to receive the cakes in succession from the magazine and to place them immediately over the lower-finger, a hook-slide fitted and secured to the lower surface of the feed-slide by a stud engaging with a slot in the hook-slide, said hook-slide having forwardly extending hooks and rearwardly extending forks fitted to a guide on the lower surface of the feed slide, a spring to draw the hook-slide rearwardly on the feed-slide to grip the cake between the hooks and the front edge of the feed-slide, a stop on the frame to engage with one of the hook-slides, rear fork ends to open the hook-slide on the feed-slide to receive a cake, said hooks being spaced to permit the finger to pass between them, means to move the feed-slide to place the cake over the lower-finger, means to deliver the envelops onto the cake, an upper-finger, a folding mechanism, and means to swing the fingers to grip the cake and envelops and to deliver them into the folding mechanism.

28. In a wrapping machine, the combination with a suitable bed-plate, of upwardly and rearwardly inclined side pieces thereon, a folding mechanism on the upper, rear ends of the side pieces, an upwardly and forwardly inclined receiving chute secured on the side pieces immediately in front of and below the folding mechanism, means to deliver the cake and its envelops to the folding mechanism, means to expel the wrapped cakes from the folding mechanism downwardly and forwardly to the foot of the chute, a lifter pivotally supported on the frame and arranged at the foot of the chute, said lifter being of less width than the cakes, and cam operated means to operate the lifter to raise the cakes in the chute and permit the last wrapped cake to enter the foot of the chute.

29. In a wrapping machine, the combination with a bed-plate, of a main shaft journaled on the rear of the bed-plate, a parallel driving shaft journaled on the bed-plate, a pinion on the driving shaft, means to apply power to the driving shaft, a countershaft journaled on the bed plate, a short countershaft journaled on the bed-plate, both countershafts being arranged at right angles to the main shaft and directly connected thereto by beveled pinions; five cam-wheels fixed on the main shaft as follows—a gear-cam-wheel having an edge gear meshing with the driving shaft pinion and having a cam groove on one side and a cam-ridge on the other side, a cutter-cam-wheel having cam grooves on both sides and an edge cam, a feed-cam-wheel having a side cam groove, a finger-cam-wheel having cam grooves on both sides; a gripper-cam-wheel on the countershaft having cam grooves on both sides and an edge cam, a folding-cam-wheel on the countershaft having a cam groove, a sprocket on the short countershaft; reels to carry the wrapper strips, a box for the bundle of separated labels, a magazine for the cakes to be wrapped, upper and lower fingers for gripping each cake and its envelops and transferring them to the folding position, a feed-slide for feeding the cakes in succession to the fingers, a wrapper gripper to draw out the wrapper strips and to place each wrapper on the cake, a slackener to form a loose portion in the strips, a cutter to cut the wrappers in succession from the strips, a clamp to clamp fast the strips after they have been drawn out, a nozzle leaf on the front edge of the label box, a pump connected to the nozzle-leaf to draw the front edges of the bottom label against the leaf by pneumatic pressure, rocking means to swing down the nozzle-leaf and the label edge, a label gripper to draw out said label onto the wrapper and the cake, a gummer to apply gum to each label as it is being drawn out, end-folders to crimp the ends of the wrappers in the folding position, a folder-slide to fold the rear flaps of the envelops, an expeller-slide to expel the cake from the folding position and to fold the front flaps, a receiving chute adjacent to the folding position to receive the expelled cakes and a lifter to lift the cakes in the chute; and operative connections respectively between the slackener and the cam groove on the gear-cam-wheel, between the pump and the cam ridge on the gear-cam-wheel, between the clamp and one cam groove on the cutter-cam-wheel, between the cutter and the other cam groove on the cutter-cam-wheel, between the folder-slide and one cam groove on the slide-cam-wheel, between the expeller-slide and the other cam groove on the slide-cam-wheel, between the lifter and the edge cam on the slide-cam-wheel, between the feed-slide and the feed-cam-wheel cam groove, between the fingers and the respective cam grooves on the finger-cam-wheel, between the grippers and the respective grooves on the gripper-cam-wheel to draw back the grippers, between the grippers and the edge cam on the gripper-cam-wheel to close the grippers, between the end-folders and the cam groove on the folding-cam-wheel, and between the gummer and the sprocket on the short countershaft, substantially as described and shown.

30. In a wrapping machine, the combination with a suitable supporting bed-plate and frame, of reels to carry the wrapper strips, a box for the bundle of separated labels or binders, a magazine for the cakes to be wrapped, fingers for transferring the cakes and envelops to the folding position, feeding means to deliver the cakes from the magazine to said fingers, means to draw out the wrapper strips and to place each wrapper on the cake, a slackener to form a loose portion in the wrapper strips, a cutter to cut the wrapper from the strips, a clamp to clamp the strips after they have been drawn out, a nozzle-leaf, a pump automatically to hold the front edge of each label against the nozzle-leaf, means to move the nozzle-leaf to separate the front edge of the lowest label, means to draw out each label onto the cake, a gummer to gum the labels as they are being drawn out, means to crimp the ends of the envelops, means to fold the back flap of the envelops, means to expel the cake from the folding position and to fold the front flaps, means to lift the expelled cakes in a chute, a main shaft journaled on the rear of the base, means to operate the main shaft, and five cam wheels on said main shaft as follows—gear-cam-wheel having a right cam groove and a left cam ridge, cutter-cam-wheel having right and left cam grooves and edge cams, slide-cam-wheel having right and left cam grooves and an edge cam, feed-cam-wheel having a cam groove, finger-cam-wheel having right and left cam grooves, a countershaft directly connected to the main shaft, a gripper-cam-wheel on the countershaft having front and rear cam grooves and an edge cam, and a folding-cam-wheel having a cam groove, a short countershaft directly connected to the main shaft, operative connections respectively between the slackener and the right cam groove on the gear-cam-wheel, between the pump and the left cam ridge on the gear-cam-wheel, between the clamp and the right cam groove on the cutter-camwheel, between the cutter and the left cam groove on the cutter-cam-wheel, between the nozzle-leaf and the edge cams on the cutter-cam-wheel, between the back flap folding means and the right groove on the slide-cam-wheel, between the expeller means and the left groove on the slide-cam-wheel, between the lifter and the edge cam on the slide-cam-wheel, between the feeding means and the feed-cam-wheel cam groove, between the respective fingers and the respective grooves on the finger-cam-wheel, between the wrapper draw-out means and the rear groove on the gripper-cam-wheel, between the label drawout means and the front groove on the gripper-cam-wheel and between both the wrapper and the label drawout means and the edge cam on the gripper-cam-wheel, between the end crimping means and the cam groove on the folding-cam-wheel, between the gummer and the short countershaft, and means to operate the main shaft, substantially as described and shown.

31. In a wrapping machine, the combination with a supporting frame, of a folding mechanism, means to deliver the cakes and envelops to the folding mechanism, a chute adjacent to the folding mechanism, means to move the wrapped cakes from the folding mechanism to the chute, a lifter to raise and support the cakes in the chute, means to advance the lifter to raise the cakes and to retract the lifter when the last folded cake has been moved to engage with the edge of the lowest cake in the chute, and means temporarily to secure a packing box on the end of the chute, directly to receive the cakes.

32. In a wrapping machine, the combination with a supporting frame for the parts, of a magazine for the cakes to be wrapped, of transferring fingers, a feed slide to deliver the cakes single and in succession from the magazine to the fingers, means to operate the feed slide, means to deliver the envelops over the cakes, a folding mechanism arranged in front of and at a higher level than the feed-slide and envelop delivering means at an angle of less than 90° to said feed-slide, and means to move the fingers first to grip the cake and the envelop and then to swing the cake and the envelop into the folding mechanism.

33. In a wrapping machine, the combination with a suitable supporting frame for the parts, of transferring fingers, means to deliver the cake to be wrapped to the fingers, means to support the wrapper strip, a box for the separated labels, two grippers and means to operate said grippers respectively to draw out the wrapper and label and place them in position on the cake, means to apply gum to one edge of the label, means to sever the wrapper from its strip, means to fold the wrapper and label around the cake, said folding means being arranged at an angle not substantially greater than 45° with reference to the delivery means, and means first to move the fingers to grip the cake and said envelops and second to swing the cake and envelops through said angle to the folding means.

34. In a wrapping machine, the combination with a suitable supporting frame for the parts, of transferring fingers, means to deliver the cake to be wrapped to the fingers, a reel for the wrapper strip, a box for the separated labels, two grippers and means to operate the grippers respectively to draw out the wrapper and place it on top of the cake and to draw out the label and place it on top of the wrapper, means to gum the label edge, means to sever the wrapper from the strip, means to fold the wrapper and label around the cake, said folding means being arranged in front of and at a higher level than the delivering means and at an angle not substantially greater than 45° with reference to said delivering means, and means to move the fingers first to grip the cake and the envelops and second to transfer the cake and the envelops through said angle to the folding means.

35. In a wrapping machine, the combination with a suitable frame for the parts, of an expeller-slide fitted to the frame, a folder-slide fitted to move on the frame parallel and adjacent to the expeller-slide, top and bottom cross-bars on the frame, said bars being arranged parallel and suitably spaced to receive between them the cake when moved by the expeller-slide end-folders arranged on each side and substantially spanning at each end the space between the said slides and said bars, said slides, bars and end-folders being arranged to form the four sides of a folder-box into which the cake and its envelops are introduced, means to deliver the cake and envelops into the folding-box and thereby turn back the edges of the envelops against the four edges of the sheets, means to move the end-folders to crimp in the end folds, means to move the folder-slide to fold the back flap, and means to move the expeller-slide to expel the cake from the box between the cross-bars and thereby fold the front flap.

In testimony whereof I affix my signature in presence of two witnesses.

RICHARD A. BERGER.

Witnesses:
CHAS. J. KLEBER,
JULIUS H. KAESEN.